INVENTOR.
STEWART L. SHELDON
BY Jerome P. Bloom
ATTORNEY

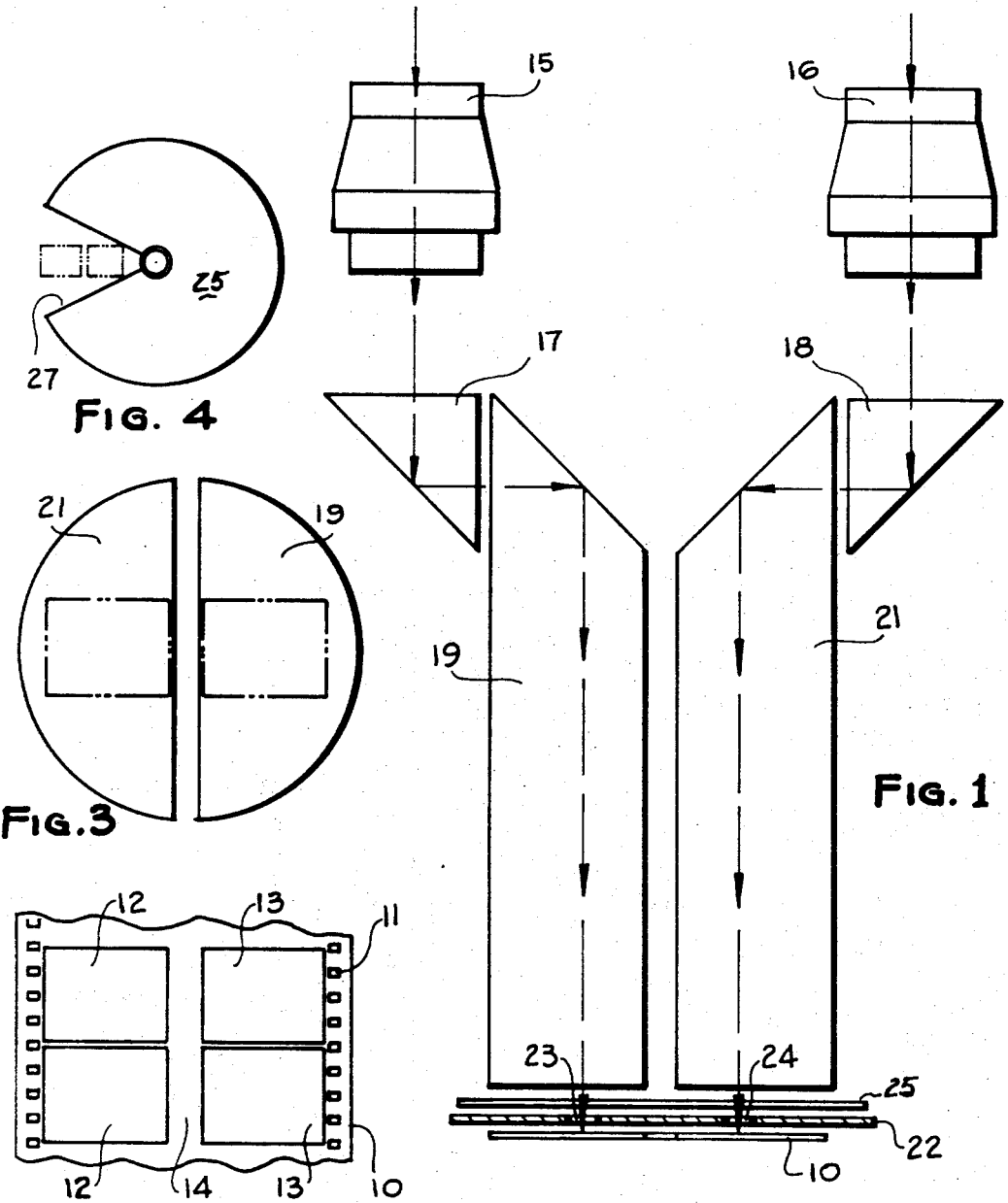

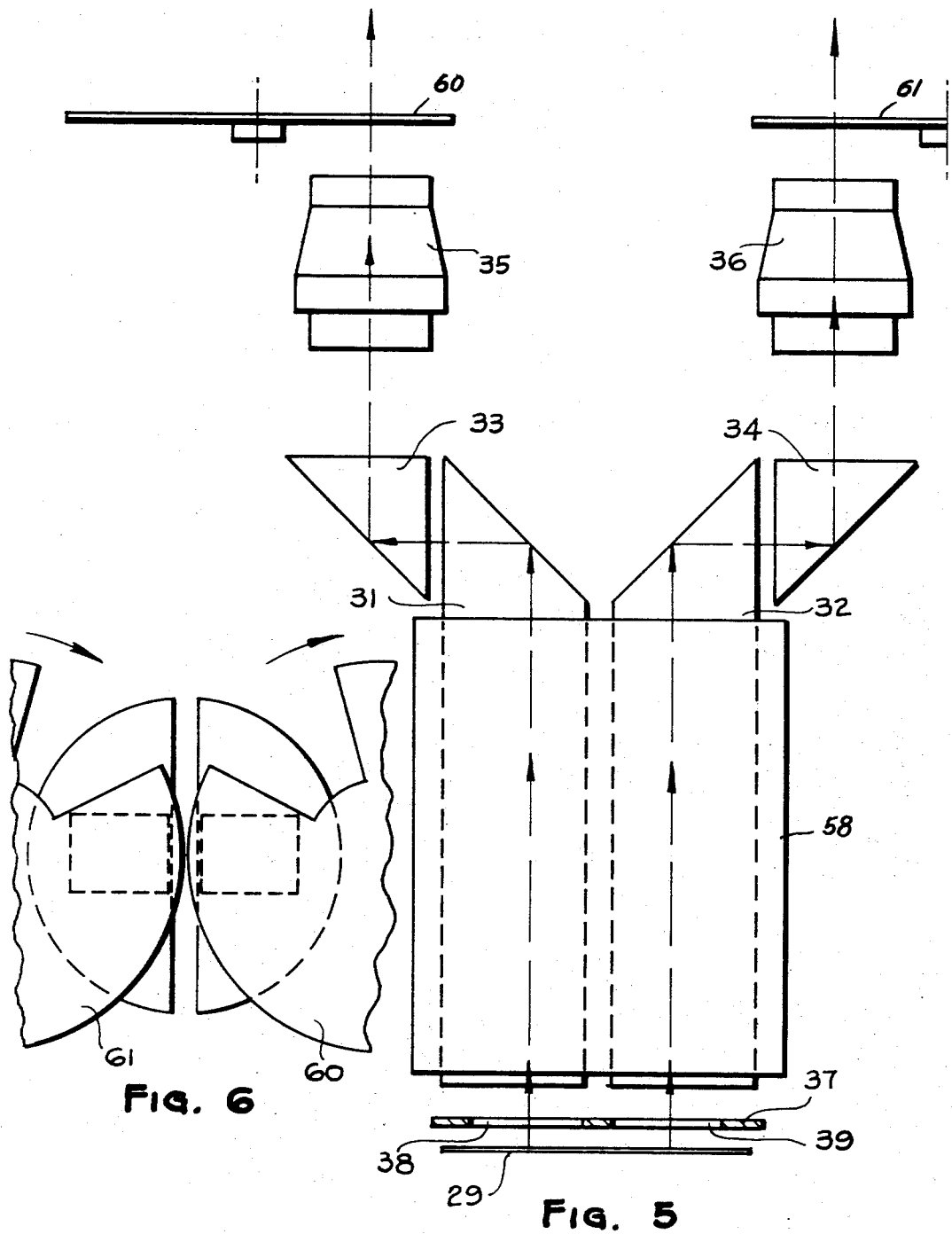

United States Patent Office 3,418,044
Patented Dec. 24, 1968

3,418,044
PHOTOGRAPHIC SYSTEM FOR THREE-
DIMENSIONAL PROJECTION
Stewart L. Sheldon, 105 N. Broadway,
Trotwood, Ohio 45407
Filed Dec. 9, 1965, Ser. No. 513,672
10 Claims. (Cl. 353—71)

ABSTRACT OF THE DISCLOSURE

A three-dimensional image projection system comprising a film strip with right and left eye image frames in a laterally spaced relation and a sound track intermediate thereof. A pair of spaced apart elongated hemicylindrical prisms in side by side relation are aligned with each image frame on the film strip to conduct the images directly from the film strip and reduce the straying or diffusion of light, resulting in sharper and more precise images. A pair of intermediate prisms pick up the images from the elongated prisms and reflect them to a pair of projection lens elements. A pair of timed, out of phase, shutters are spaced outwardly from each lens element to produce a time spaced projection of right and left eye images as each pair of laterally spaced frames reaches the lens elements. Each intermediate prism is connected to its respective lens element for unison and adjustment therewith.

---

This invention relates to photographic systems for achieving three-dimensional projection, and more particularly to systems which obviate the need for special viewing surfaces and for the viewers to wear corrective lenses.

A primary object of the invention is to provide means for achieving more effective three-dimensional projection as described, enabling the capturing and projection of sharper images and permitting the use of wide angle lenses.

Another object is to provide a unique optical system for the simplified adaptation of standard cameras and projectors for use in three-dimensional photography.

A further object of the invention is to provide a film strip which records right and left eye images in a laterally spaced relation so as to leave an intermediate area for sound recording.

Still another object of the invention is to introduce in three dimensional photographic equipment a use of elongated prisms arranged to conduct images directly to or from a film strip and in a manner to reduce the likelihood of the straying or diffusion of light, resulting in sharper and more precise images.

An additional object of the invention is to provide systems for achieving improved three dimensional pictures possessing the advantageous features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a partly diagrammatic view of image recording means in accordance with the illustrated embodiment of the invention;

FIG. 2 is a fragmentary view of a film strip as used in the photographic system of FIG. 1;

FIG. 3 is an end view of the elongated prism elements used in the optical system of FIG. 1, indicating the relative position thereof to frames of the film strip, parts being eliminated for clarity of disclosure;

FIG. 4 is a diagrammatic view of shutter means as used in the embodiment of FIG. 1;

FIG. 5 is a view like FIG. 1, showing the invention system adapted for image projection;

FIG. 6 is a schematic view illustrating the principle of the projector control shutters, the shutters being shown offset to the original lines of the projected images for simplicity of disclosure;

Like parts are indicated by similar characters of reference throughout the several views.

Figures 7, 8:
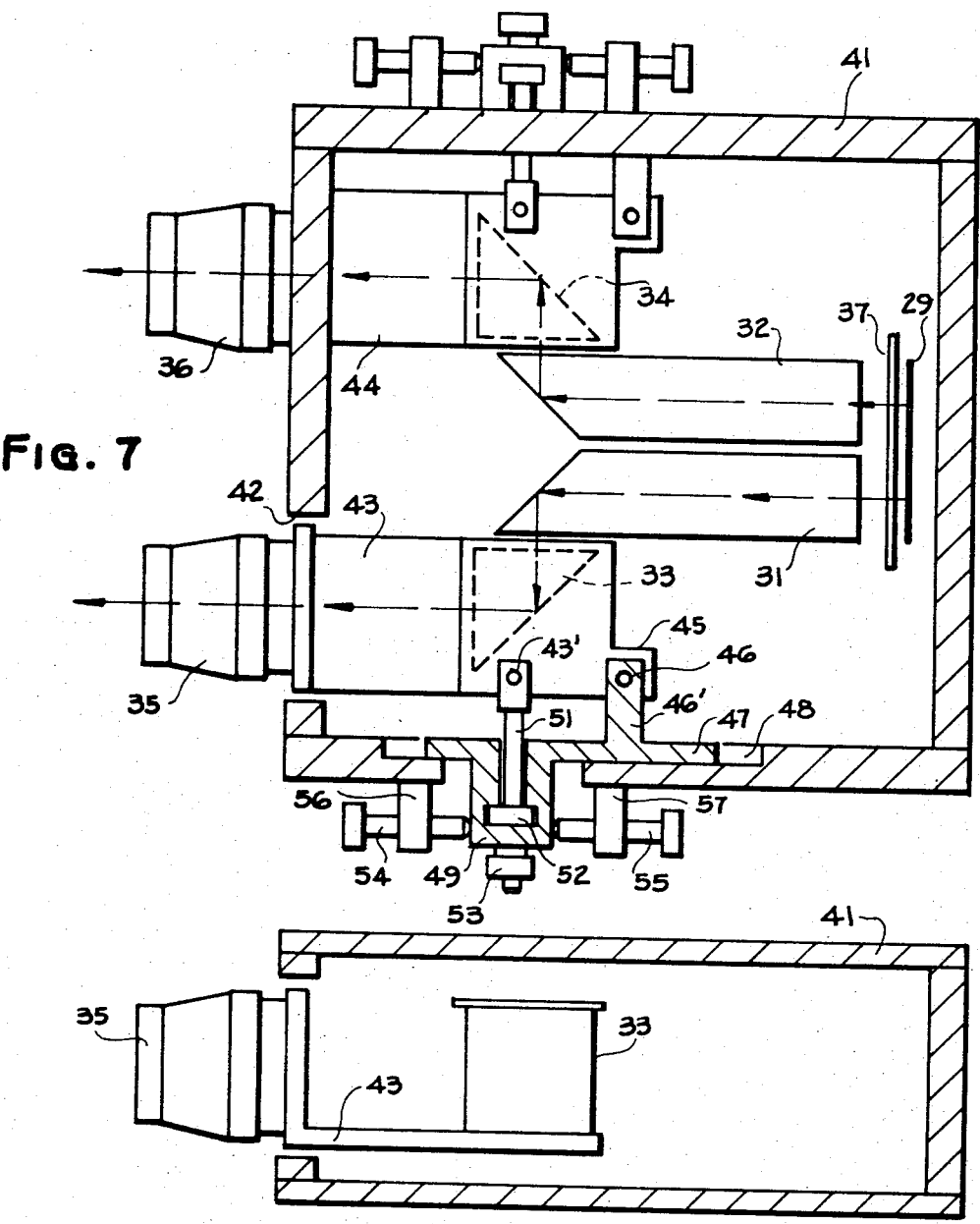
FIG. 7 is a partly diagrammatic top plan view showing the projecting apparatus of FIG. 5 in conjunction with unique means for achieving lens adjustment.
FIG. 8 is a fragmentary schematic view in side elevation of the apparatus of FIG. 7, showing the manner of interconnection of each lens with a first prism element of the optical system.

Referring to the drawings, a photographic system in accordance with the invention illustrated comprises an image recording apparatus as indicated in FIGS. 1 to 4 and an image projecting apparatus as indicated in FIGS. 5 to 8 of the drawings. The optical segment, involving lenses and a system of prisms, is the same for both the recording and projecting systems, the transmission of light images being merely reversed in the respective systems.

Film as used in the image recording apparatus comprises, as shown in FIG. 2, a strip 10 having marginal perforations 11 which are conventionally engaged by drive sprockets (not shown) for feeding the film. It is contemplated in the practice of the invention that intermediate its margins the strip 10 eventually include a continuous vertical series of laterally spaced apart frames 12 and 13 and that the spacing between the rows of frames 12 and 13 be utilized for a sound track.

As shown in FIG. 1 of the drawings, in the recording system of the invention the film strip 10 moves in a plane longitudinally spaced from relatively projected laterally spaced apart lenses 15 and 16. These lenses are adapted to receive images respectively corresponding to the left eye and the right eye of an observer and to transmit them rearwardly in a sense generally perpendicular to the strip 10.

As indicated in FIG. 1, the images picked up by lenses 15 and 16 are respectively transmitted to the hypotenuse surfaces of 45° prisms 17 and 18. From here they are deflected to the angular outer ends of elongated hemicylindrical prisms 19 and 21. At their opposite ends the prism elements 19 and 21 terminate in surfaces which are in a nearby and generally parallel relation to the strip 10. Thus, images are conducted through the extended lengths of the elements 19 and 21 and are cast through their inner ends to imprint in a direct and precise fashion on the strip 10. The simple and direct, relatively extended, transmission media provided by the elongated prisms preclude the loss of light and insure that the imprint is sharp and authentic.

Interposed between the inner ends of the prism elements 19 and 21 and the film strip 10 is first a control shutter 25 and, immediately to its rear, an aperture plate 22. The latter is formed with laterally spaced apart relatively small size openings 23 and 24 positioned to align with the image transmission lines of the elements 19 and 21. The openings 23 and 24 serve as fixed apertures directing the received images upon the film strip 10 as determined by the timing of shutter 25. The transmitted images are thus cast upon laterally spaced apart locations of the film strip, in positions producing left and right eye recordings in laterally spaced apart frames 12 and 13.

In the example shown, images received by the left eye lens 15 are transmitted through prisms 17 and 19 to fall on frames 12 of the film strip. Similarly, images transmitted by the right eye lens 16 are directed through prisms 18 and 21 to fall upon frames 13 of the film strip.

Note that the prism elements 19 and 21 have a close but spaced apart relation and are rotatably positioned to have their diametral surfaces forming flat sides facing one another. The spacing between the prism elements serves to define the previously mentioned center film area 14 of the strip 10. This area provides an optimal position for the sound track which may be imposed thereon remote from interference by the perforations 11. Shaped and positioned as described, the elements 19 and 21 complement one another in defining a generally cylindrical prism structure adapted to fit within the lens mount of a conventional camera or projector. A further feature of the optical segment above described is that the outwardly projected position of the lenses 15 and 16 permits a use of large, wide angle lenses.

It is to be noted that the images received in the recording system are transmitted by the elongated prisms 19 and 21 to a location adjacent to the plane of the film strip 10. Thus, opportunity for the images to stray or become diffused is thus minimized. As a result, sharp, well defined images are recorded on the film strip.

As previously noted, in the practice of the invention the film strip may be advanced by any conventional means and in any conventional manner. However, the invention does have some particular advantage in cameras which advance the film in accordance with a 70 mm. principle of exposure. In this instance the pull down or advance of the film strip is such as to produce successive pairs of image frames 12 and 13 in the successive alignment of following film strip portions with the aperture plate openings 23 and 24.

As mentioned, the recording of images on the film strip 10 is controlled by shutter means 25 disposed between the inner ends of prism elements 19 and 21 and the aperture plate 22. The shutter means may be various type. However, in the example illustrated the shutter is shown as an enlarged disc. As seen in FIG. 4, a part of the disc is removed to provide an opening 27 for the timed transmission to the film strip of the light images passing through the prisms 19 and 21 as the shutter rotates. The feed of the strip is of course suitably timed by means the details of which form no particular part of the invention and therefore need not be further described.

Turning now to the projecting system of FIGS. 5 to 8 of the drawings, here the described image recording system is substantially reversed. In this case the source of light originates in the back of a processed film strip 29 having images recorded thereon as described in connection with the strip 10. The light, indicated by the arrows as following separate courses, passes through each pair of frames as they successively align with the inner ends of the elongated prisms 31 and 32, the latter corresponding in construction and arrangement to prisms 19 and 21. The depicted images are reflected from the angular outer ends of the prisms 31 and 32, respectively, through flat sides of the adjacent intermediate prisms 33 and 34 whence they are directed from the hypotenuse surfaces of the latter prisms to respectively pass through one of an outwardly projected pair of lenses 35 and 36. The lenses 35 and 36 are accordingly adapted to project left and right eye images in the same manner as the lenses 15 and 16 receive left and right eye images. The projected images are focused on a viewing surface.

In the projection system an aperture plate 37 is interposed between film strip 29 and prism elements 31 and 32. The plate 37 includes relatively large diameter spaced openings 38 and 39. These openings provide for projection of the light images therethrough from the film strip to the prism elements. Spaced outwardly from and in overlying relation to the respective lens elements 35 and 36 are a pair of timed, out of phase, shutters 60 and 61. The shutters may be conventional and driven by any suitable means to produce a time spaced projection of right and left eye images as each pair of laterally spaced frames reaches the lens elements. FIG. 6 of the drawings schematically illustrates this principle by showing the use of identical disc shutters which may be counter-rotated. They are so designed to have openings which expose left and right eye images from a laterally spaced pair of frames in such a closely timed spaced relation that on projection to a screen the effect thereof is, in any one instance, a superposition of the images to produce a true three-dimensional picture.

Thus, the construction and arrangement of the projecting system is, like the image recording system, adapted for mounting in a conventional carrier, the only change being in the reversal of the optical system.

In function the prisms 31 and 32 have their one ends adjacent the film so they immediately pick up the full range of the recorded images with optimal light properties and contain the images with minimal loss in their axial transmission from the film strip. In the optical segment of the invention system there is only a short offset in the image flow. The images leave the angular (approximately 45°) surfaces at the outer ends of the containing prisms to be immediately and finally straightened out to pass in an optimal condition through the associated wide range lenses. The use of the latter is enabled by the outwardly displaced positioning of the lens elements as provided by the present invention. The shutters 60 and 61 then provide for the time spaced projection of the right and left eye images of each pair of frames.

A further feature of the invention is the interrelated nature of the respective lenses 35 and 36 and the immediately adjacent 45° prisms. Each lens element 35 and 36 and its respectively associated intermediate prism element 33 and 34 is interconnected for unison adjustment in such manner that the aligned relationship between the prism element and the lens is unchanged at all times. This is diagrammatically shown in FIGS. 7 and 8 of the drawings. There illustrated are the elongated prism elements 31 and 32 which are centrally disposed in a relation as previously described in a housing frame 41. A front wall of the housing 41 provides individual openings 42 (one shown) through which the lenses 35 and 36 project. Noting the drawings, attached to the inner ends of the lenses and projecting rearwardly within the housing 41 are respective angularly shaped frame members 43 and 44 each including a rearwardly projected wall portion parallel to the central axis of the associated lens. Fixed to the inner extremities of the frame members 43 and 44 on their said wall portions are the respective intermediate prism elements 33 and 34. Each assembly comprising a lens, angle frame member and a connected prism is movable as a unit, and, as seen, is adapted for motion both in a longitudinal and in a bodily rocking sense.

Individual means are provided for achieving movement of each lens assembly. Since these means are identical, only that operating in connection with lens 35 will be described. As there shown, the frame member 43 has a rearwardly projecting tail portion 45 pivotally connected at 46 to an arm 46' projected from a slide member 47. The latter is installed for longitudinal sliding motion in a slideway 48 in an adjacent sidewall of the housing frame 41. Intermediate its ends the slide member 47 is formed with a boss 49 laterally projecting in a sense outwardly through an opening in the frame 41. A post 51 projects through the boss into a pivotally connected relation to the angle frame 43. This latter connection provides a pivot 43'. The post 51 is threaded and engages a nut 52 confined in the boss 49 as seen in FIG. 7 of the drawings.

An outer end of the post 51 projects outside the boss 49. Turning motions applied to the projected end of the post result, through the cooperation of nut 52, in an axial extending or retracting motion of the post with a consequent rocking adjustment of the frame 43 and mounted parts about the pivot 46. A lock nut 53 on the outer end of post 51 is adjustable to hold the parts in a selected position of rocking adjustment.

Other aligned adjusting posts 54 and 55 engage the boss 49 at opposite points thereof externally of the housing 41. These posts are mounted in respective housing brackets 56 and 57. The arrangement is such that when rotated, the posts react to apply a longitudinal thrust to the boss 49 and to the slide of which it is a part. By virtue of the connected relation of the boss to the angle frame 43 provided by post 51 and arm 46', the lens assembly may thus be shifted longitudinally under adjustment of posts 54 and 55.

Fine increments of adjustment in both a longitudinal and a bodily rocking sense are accordingly possible. Such movements are individual with respect to the separate lenses 35 and 36 and are partaken of by the associated intermediate prisms 33 and 34 to maintain the positions of direct preset alignment between these prism elements and their respectively associated lenses.

The availability of the versatile adjustment of the lenses provides optimal focusing properties. This is extremely important since no two lenses are precisely alike. By the use of the available adjustment, in projection, the right and left eye images remain authentic. This results in optimal viewing conditions.

Of course, there can be a conjoint movement of the lenses by means of a mechanical interconnection. However, this is not preferred.

The time spaced superposition of the images as provided by the invention projector is so fast that three-dimensional portrayal results without the viewer realizing the natural lateral offset of the left and right images on a viewing screen. As a matter of fact, this is what produces an unusually true reproduction of the picture originally sighted through the image recording system.

The focusing structure as described is applied to and function equally as well in the image recording unit.

As can be seen from the above disclosure, the invention produces a new depth to three-dimensional photographic equipment enabling precise, sharply defined pictures to be effected in a relatively simple fashion.

It is shown in the drawings that the optical prisms may be suitably shielded from heat, as for example by a water jacket 58, shown in FIG. 5 as surrounding the mating prisms 31 and 32.

From the above description it will be apparent that there is thus provided a device of the character described possessing the particular features of advantage before enumerated as desirable, but which obviously is susceptible of modification in its form, proportions, detail construction and arrangements of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A photographic system for achieving three-dimensional projection, said system providing a film station and relatively spaced apart lens elements, characterized by image transmitting prism means between said lens elements and said film station, said prism means including a pair of elongated prism elements in a side by side spaced apart relation terminating at their one ends in a common plane in adjacent generally parallel relation to film appearing at said film station, said prism means further including an angular intermediate prism aligned with each lens element, the opposite ends of said elongated prisms having angular configurations for a transmission of light images between said intermediate prisms and respective longitudinal prisms, said elongated prism elements having a complementary form which in the composite produces in cross-section a generally arcuate periphery therefor adapted to fit in the lens mount of a conventional camera or projector.

2. A photographic system according to claim 1, wherein a film strip is incorporated to move through said station, said strip being of a width to provide for a series of pairs of adjacent laterally spaced frames, further characterized by said elongated prism elements having a hemicylindrical form and a space therebetween corresponding to the spacing between said adjacent frames, aperture plate means disposed between said film strip and the said one ends of said elongated prisms and openings in said plate means aligning with said elongated prisms and with laterally spaced locations on said film strip as it appears at said station.

3. A photographic projector system according to claim 1, wherein a film strip moves through said station having a vertical series of pairs of laterally spaced frames, each pair constituting a right and left eye image, further characterized by shutter means disposed outwardly of and adjacent to the projecting end of each lens, said shutter means being operable to expose left and right eye images in alternating sequence whereby left and right eye images are cast through said lenses in immediate time spaced relation to produce a sharp three-dimensional view on a viewing screen.

4. A photographic system for achieving three-dimensional projection, said system providing a film station and relatively spaced apart lens means, characterized by image transmitting prism means between said lens means and said film station, said prism means including a pair of elongated prism elements in a side by side spaced apart relation terminating at their one ends in a common plane in adjacent generally parallel relation to film appearing at said film station, said elongated prisms being generally hemicylindrical in shape and rotatively positioned to have their flat sides facing one another, said elongated prisms complementing one another to form a generally cylindrical prism structure.

5. A photographic system for achieving three-dimensional projection, said system providing a film station and relatively spaced apart lens means, characterized by image transmitting prism means between said lens means and said film station, said prism means including a pair of elongated prism elements in a side by side spaced apart relation terminating at their one ends in a common plane in adjacent generally parallel relation to film appearing at said film station, said lens means comprising a pair of spaced lenses and said prism means further including an intermediate prism aligned with each lens and connected thereto for unison adjustment, said elongated prisms being disconnected from said intermediate prisms and having angular configurations at their opposite ends for a transmission of light images between said intermediate prisms and respective elongated prisms, and means interconnected with and adapted for individual adjustment, in each of a plurality of senses, of each assembly comprising a lens and a connected intermediate prism.

6. A photographic system for achieving three-dimensional projection, said system providing a film station and relatively spaced apart lens elements, characterized by image transmitting prism means between said lens elements and said film station, said prism means including a pair of elongated prism elements in a side by side spaced apart relation terminating at their one ends in a common plane in adjacent generally parallel relation to film appearing at said film station, said prism means further including an angular intermediate prism aligned with each lens element, the opposite ends of said elongated prisms having angular configurations for a transmission of light images between said intermediate prisms and respective longitudinal prisms, the angular intermediate prism aligned with each said lens element being connected thereto for unison adjustment therewith, and said elongated prisms being disconnected from said intermediate prisms.

7. A photographic system for use in achieving three-dimensional projection, said system providing a film station and relatively spaced apart lens means characterized by a film strip for moving through said film station, said lens means being remote from said film station, image transmitting prism means interposed between said lens means and said film strip, said prism means extending substantially to said film station and defining paths for transmitting, respectively, left and right eye images in side by side spaced apart relation, said lens means being constituted by a pair of lens elements for respectively transmitting a left and a right eye image and a portion of said prism means being interconnected to each of said lens elements for unison adjustment therewith and the balance of said prism means being disconnected from said portion.

8. A photographic system for use in achieving three-dimensional projection, said system providing a film station and relatively spaced apart lens means, characterized by a film strip for moving through said film station, said lens means being remote from said film station, and image transmitting prism means interposed between said lens means and said film strip, said prism means extending substantially to said film station and defining paths for transmitting, respectively, left and right eye images between said lens means and said film strip in side by side spaced apart relation, said lens means being constituted by a pair of lens elements for respectively transmitting a left and right eye image viewed thereby and a portion of said prism means being interconnected to each of said lens means for unison adjustment and means interconnected with and adapted for individual adjustment, in each of a plurality of senses, of each assembly comprising a lens element and a connected portion of said prism means.

9. A photographic system for achieving three-dimensional projection, including a film station, generally cylindrical prism means disposed substantially at right angles to a plane of motion through which film is advanced in said station, an end of said prism means approaching said station in parallel adjacent relation to said plane of motion, said prism means being comprised of laterally spaced portions, adjacent sides of which are flat and the balance of the periphery thereof being arcuate so as to fit in the lens mount of a conventional camera or projector, right and left eye lens elements, and means for conducting light images between said lens elements and the opposite end of said cylindrical prism means, right and left eye images being conducted through a respectively different portion of said generally cylindrical prism means.

10. A photographic system for achieving three-dimensional projection, including a film station, generally cylindrical prism means disposed substantially at right angles to a plane of motion through which film is advanced in said station, an end of said prism means approaching said station in parallel adjacent relation to said plane of motion, said prism means being comprised of separated portions with at least one flat side oriented to have their said one flat sides in adjacent relation, right and left eye lens elements, and means for conducting light images between said lens elements and the opposite end of said cylindrical prism means, right and left eye images being conducted through a respectively different portion of said generally cylindrical prism means, said last mentioned means comprising another prism intermediate each lens element and respective portions of said generally cylindrical prism means and means interconnected with and adapted for individual adjustment, in each of a plurality of senses, of each assembly comprising a lens element and a connected intermediate prism, the lens element and the connected intermediate prism in each instance having a continuously fixed relation.

References Cited

UNITED STATES PATENTS

| | | | |
|---|---|---|---|
| 1,259,365 | 3/1918 | Cooper | 352—59 |
| 1,515,428 | 11/1924 | Bovin | 88—24 |
| 1,851,705 | 3/1932 | Herz | 88—24 |
| 2,517,246 | 8/1950 | Seitz et al. | 88—24 |
| 2,968,217 | 1/1961 | Fwald | 88—24 |
| 660,442 | 10/1900 | Ives | 95—18 |
| 2,299,738 | 10/1942 | Collins | 352—38 |
| 3,189,915 | 6/1965 | Tondreau | 352—60 |

FOREIGN PATENTS

| | | |
|---|---|---|
| 338,299 | 3/1936 | Italy. |
| 1,002,452 | 10/1951 | France. |
| 223,476 | 10/1924 | Great Britain. |
| 349,942 | 5/1931 | Great Britain. |
| 634,250 | 11/1927 | France. |

NORTON ANSHER, *Primary Examiner.*

R. M. SHEER, *Assistant Examiner.*

U.S. Cl. X.R.

350—135; 353—81